(12) United States Patent
DeRosa et al.

(10) Patent No.: US 9,174,879 B2
(45) Date of Patent: Nov. 3, 2015

(54) CERAMIC PRECURSOR BATCH COMPOSITION AND METHOD OF INCREASING CERAMIC PRECURSOR BATCH EXTRUSION RATE

(75) Inventors: Michael Edward DeRosa, Painted Post, NY (US); Lung-Ming Wu, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 325 days.

(21) Appl. No.: 12/275,007

(22) Filed: Nov. 20, 2008

(65) Prior Publication Data

US 2009/0140452 A1 Jun. 4, 2009

Related U.S. Application Data

(60) Provisional application No. 61/004,996, filed on Nov. 30, 2007.

(51) Int. Cl.
*C04B 35/636* (2006.01)
*C04B 35/195* (2006.01)
*C04B 35/478* (2006.01)

(52) U.S. Cl.
CPC ........... *C04B 35/6365* (2013.01); *C04B 35/195* (2013.01); *C04B 35/478* (2013.01); *C04B 2235/6021* (2013.01)

(58) Field of Classification Search
CPC   C04B 35/6365; C04B 35/195; C04B 35/478; C04B 2235/6021
USPC .................................................... 264/177.11
See application file for complete search history.

(56) References Cited

U.S. PATENT DOCUMENTS

| | | | |
|---|---|---|---|
| 4,061,859 A | 12/1977 | Cheng | 536/88 |
| 4,551,295 A | 11/1985 | Gardner et al. | 264/177 |
| 5,340,516 A * | 8/1994 | Yavuz et al. | 264/630 |
| 5,719,274 A | 2/1998 | Doenges et al. | 536/85 |
| 5,795,928 A | 8/1998 | Janssen et al. | 524/48 |
| 5,797,081 A | 8/1998 | Brundage et al. | 419/67 |
| 5,928,709 A | 7/1999 | Doenges et al. | 427/2.14 |
| 6,080,345 A | 6/2000 | Chalasani et al. | 264/109 |
| 6,113,829 A | 9/2000 | Bookbinder et al. | 264/211.11 |
| 6,200,517 B1 | 3/2001 | Peng et al. | 264/630 |
| 6,207,101 B1 | 3/2001 | Beall et al. | 264/630 |
| 6,300,266 B1 | 10/2001 | Beall et al. | 501/119 |
| 6,344,078 B1 | 2/2002 | Beall et al. | 106/285 |
| 6,368,992 B1 | 4/2002 | Beall et al. | 501/94 |
| 6,372,033 B1 | 4/2002 | Chalasani et al. | 106/140.1 |
| 6,843,955 B2 | 1/2005 | Ghosh et al. | 264/645 |
| 6,878,337 B2 | 4/2005 | Noguchi et al. | 419/17 |
| 6,896,928 B2 | 5/2005 | Allaire et al. | 427/154 |
| 2001/0021387 A1 | 9/2001 | Krammer et al. | 424/401 |
| 2002/0185786 A1 | 12/2002 | Makino et al. | 264/631 |
| 2004/0181009 A1 | 9/2004 | Shelton et al. | 525/54.3 |
| 2006/0064957 A1 | 3/2006 | Ogunwumi et al. | 55/523 |
| 2006/0281627 A1 | 12/2006 | Ellison et al. | 501/134 |
| 2007/0088105 A1 | 4/2007 | Shelton et al. | 524/35 |

FOREIGN PATENT DOCUMENTS

| | | |
|---|---|---|
| CN | 1261867 | 8/2000 |
| EP | 0 700 718 | 3/1996 |
| EP | 0 714 867 | 6/1996 |
| JP | 2003-306375 | 10/2003 |
| WO | 2008/115378 | 9/2008 |

OTHER PUBLICATIONS

Dow-Methocel1 taken from Dow (http://dowwolff.custhelp.com/cgi-bin/dowwolff.cfg/php/enduser/popup_adp.php?p_faqid=880&p_created=1069427488&p_sid=7upCb3Mj&p_lva=&p_li=&p_redirect=&p_sp=cF9zcmNoPSZwX3NvcnRfYnk9JnBfZ3JpZHNvcnQ9JnBfcm93X2NudD04NDYsODQ2JnBfcHJvZHM9JnBfY2F0cz0mcF9wdj0mcF9jdj0mcF9zZWFyY2hfdHlwZT1hbnN3ZXJzLnNlYXJjaF9ubCZwX3BhZ2U9MQ**).*

Methocel Cellulose Ethers Binders and Processing Aids for Ceramics, product literature Dow Chemical Co., 1996.

Nath Das R. et al., "Rheological studies on cordierite honeycomb extrusion", Journal of the European Ceramic Society, Elsevier Science Publishers, vol. 22, No. 16, Dec. 1, 2002, pp. 2893-2900.

Sarkar N. et al., "Hydration-dehydration properties of methylcellulose and hydroxypropylmethylcellulose", Carbohydrate Polymers, Applied Science Publishers, Ltd., vol. 27, No. 3, Jan. 1, 1995, pp. 177-185.

Ekonomakou A. et al., "The influence of Binder Properties on the Plasticity and the Properties of Raw Extruded Ceramics", Key Engineering Materials, vol. 132-136, 1997, pp. 420-423.

Sarkar, N., "Thermal gelation properties of methyl and hydroxypropyl methylcellulose", J. Appl. Polym. Sci., 24, 1073-1087, (1979).

Sarkar, N.; Greminger, G.K. Jr., "Methylcellulose Polymers as Multifunctional Processing Aids in Ceramics", Ceramic Bulletin, 62, 1280, (1983).

WO199901029 4, Mar. 4, 1999, cited in place of translation of CN1261867.

Dow, "Methocel Cellulose Ethers Technical Handbook", Jun. 1997, p. 1-32.

* cited by examiner

*Primary Examiner* — Jeremiah Smith
(74) *Attorney, Agent, or Firm* — Charles A. Greene; Matthew B. McNutt; Michelle O'Brien

(57) ABSTRACT

A ceramic precursor batch composition comprising inorganic ceramic-forming ingredients, a hydrophobically modified cellulose ether binder having a molecular weight less than or equal to about 300,000 g/mole and an aqueous solvent is provided. The ceramic precursor batch composition has a ratio of binder to aqueous solvent of less than about 0.32. The ceramic precursor batch composition may be used to increase the rate of extrusion of the composition. A method for increasing a rate of extrusion of a ceramic precursor batch composition is also disclosed.

20 Claims, 5 Drawing Sheets

CERAMIC PRECURSOR BATCH COMPOSITION AND METHOD OF INCREASING CERAMIC PRECURSOR BATCH EXTRUSION RATE

RELATED APPLICATIONS

This application claims the benefit of U.S. Provisional Application No. 61/004,996, filed Nov. 30, 2007, entitled "Ceramic Precursor Batch Composition And Method Of Increasing Ceramic Precursor Batch Extrusion Rate."

FIELD

The present invention relates generally to ceramic precursor batch compositions, and particularly to ceramic precursor batch compositions for use in extruding ceramic honeycombs.

BACKGROUND

Hydrophobically modified cellulose polymers such as methylcellulose (MC) and hydroxypropyl methylcellulose (HPMC) have been used as binders in automotive substrate and diesel filter ceramic precursor batch compositions. These polymers give the batch the necessary plasticity and green strength in the forming and drying stages to produce high quality honeycomb ware. However, polymers such as MC and HPMC can undergo phase separation and subsequent gelation at a characteristic temperature. At the right temperature the polymer loses the water that surrounds the pendant methoxy side groups. This loss of hydration exposes the methoxy groups and enables hydrophobic associations to occur between the methoxy substituents of neighboring chains. This leads to phase separation and ultimately the build up of a long range network gel. (Sarkar, N., *J. Appl. Polym. Sci*, 24, 1073-1087 (1979); Methocel Cellulose Ethers Technical Handbook, Dow Chemical Co.; Li, L et al., *Langmuir*, 18, 7291-7298 (2002)). When the binder undergoes this thermal phase transition within a ceramic precursor batch, the batch becomes stiffer and the extrusion pressure increases significantly which can produce severe defects in the extruded honeycomb structure.

The thermal transition behavior of polymers like MC and HPMC can limit the extrusion process of numerous ceramic product lines. For example, production will have to significantly increase the extrusion feedrate of new diesel compositions such as aluminum titanate (AT) and advanced cordierite (AC) in the next 1-2 years due to increased demand for diesel products. However, the batch temperature increases with feedrate due to increased shear heating in the extruder. Ultimately, throughput reaches a limit as the batch approaches the thermal transition temperature of the binder.

SUMMARY

Accordingly, in light of the desire to increase federate, it would be desirable to have a ceramic precursor batch composition that allows for a greater extrusion feedrate. Such a ceramic precursor batch may stiffen at higher temperatures without sacrificing the properties of the final product such as, but not limited to, strength.

One aspect of the invention is a ceramic precursor batch composition comprising inorganic ceramic-forming ingredients, a hydrophobically modified cellulose ether binder having a molecular weight less than or equal to about 300,000 g/mole and an aqueous solvent, wherein MC/W is less than about 0.32, MC is a weight % of the hydrophobically modified cellulose ether binder based on a 100% of the inorganic ceramic-forming ingredients, and W is a weight % of aqueous solvent based on the 100% of the inorganic ceramic-forming ingredients. There is an inverse linear relationship between MC/W and the stiffening onset temperature. Keeping MC/W less than about 0.32, or even less than 0.22, allows for increased federates for the composition of the present invention.

In another aspect, the present invention includes a method for increasing a rate of extrusion of a ceramic precursor batch composition, comprising the steps of providing inorganic ceramic-forming ingredients, adding a hydrophobically modified cellulose ether binder and water to the inorganic ceramic forming ingredients wherein the hydrophobically modified cellulose ether binder has a molecular weight of less than about 300,000 g/mole and MC/W is less than about 0.32, wherein MC is a weight % of the hydrophobically modified cellulose ether binder based on a 100% of the inorganic ceramic-forming ingredients, and W is a weight % of the water based on the 100% of the inorganic ceramic-forming ingredients.

In yet another aspect, the present invention includes a method for increasing a rate of extrusion of a ceramic precursor batch composition, comprising the steps of providing an initial ceramic precursor batch composition including inorganic ceramic-forming ingredients, a high molecular weight hydrophobically modified cellulose ether binder having a molecular weight of greater than about 300,000 g/mole, and water, substituting a low molecular weight hydrophobically modified cellulose ether binder having a molecular weight of less than about 300,000 g/mole for the high molecular weight binder, and adjusting a ratio of MC/W to be less than about 0.32 wherein MC is a weight % of the hydrophobically modified cellulose ether binder based on a 100% of the inorganic cerarnic-forming ingredients, and W is a weight % of the water based on the 100% of the inorganic ceramic-forming ingredients.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
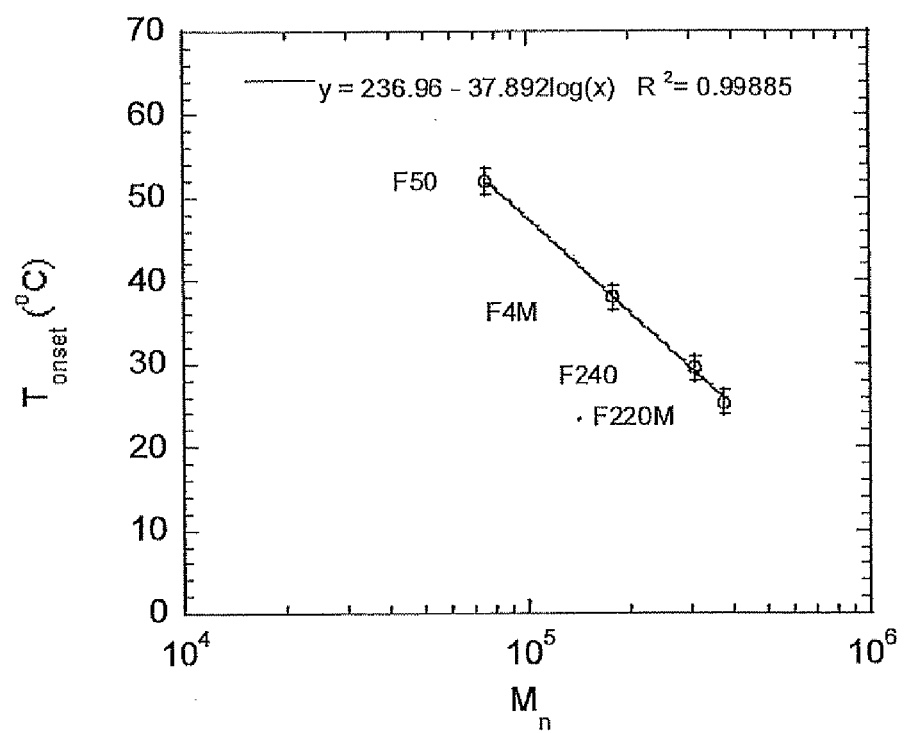
FIG. 1 is a graphical illustration showing the relationship between binder molecular weight and the stiffening onset temperature, according to one embodiment of the present invention.

Broadly, the present invention provides a ceramic precursor batch composition with a higher stiffening onset temperature, allowing for greater extrusion federates without significant increases in pressure. The composition may comprise inorganic ceramic-forming ingredients, a hydrophobically modified cellulose ether binder having a molecular weight less than or equal to about 300,000 g/mole and an aqueous solvent such as, but not limited to, water. The ceramic precursor batch composition may have a MC/W less than about 0.32 where MC is a weight % of the hydrophobically modified cellulose ether binder based on a 100% of the inorganic ceramic-forming ingredients, and W is a weight % of water based on the 100% of the inorganic ceramic-forming ingredients. There is also provided a method for increasing a rate of extrusion (feedrate) of a ceramic precursor batch composition, comprising using the ceramic precursor batch composition of the present invention.

The ceramic precursor batch composition of the present invention uses lower molecular weight hydrophobically modified cellulose ether binders and a lower MC/W ratio to provide a batch composition that has a higher stiffening onset temperature, a lower pressure during extrusion and a greater feedrate than the ceramic precursor batch compositions of the prior art using higher molecular weight hydrophobically modified cellulose ethers. It has been found that the MC/W ratio is inversely proportional to the stiffening onset temperature of the ceramic precursor batch composition. Additionally, it has also been found that lower molecular weight hydrophobically modified cellulose ether binders are more effectively hydrated, allowing for a lower MC/W ratio, which results in a higher stiffening onset temperature. Therefore, a low molecular weight binder may be substituted in a composition with all other parameters being equal to obtain a higher stiffening onset temperature. In contrast, the prior art attempts to solve the problem of lower stiffening temperatures and lower feedrates by either increasing the MC/W ratio, which can result in a weaker green body, or by including additional ingredients. The present invention does not rely on additional ingredients or increased solvent amounts.

In accordance with the invention, the present invention for a ceramic precursor batch composition includes inorganic ceramic-forming ingredients, a hydrophobically modified cellulose ether binder having a molecular weight less than or equal to about 300,000 g/mole and an aqueous solvent. The MC/W ratio is less than about 0.32 where MC is a weight % of the hydrophobically modified cellulose ether binder based on a 100% of the inorganic ceramic-forming ingredients, and W is a weight % of aqueous solvent based on the 100% of the inorganic ceramic-forming ingredients. It will be appreciated that the weight percents of the binder, solvent, and other additives are calculated as superadditions with respect to the inorganic ceramic-forming ingredients by the following formula:

$$\frac{\text{weight of binder, solvent or other additives}}{\text{weight of inorganic ceramic-forming ingredients} + \text{poreformer}} \times 100$$

The inorganic ceramic-forming ingredients may be cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, e.g., silicon carbide, silicon nitride, soda lime, aluminosilicate, borosilicate, soda barium borosilicate or combinations of these, as well as others. Combinations of these materials may be physical or chemical combinations, for example, mixtures or composites, respectively.

In one exemplary embodiment, the inorganic ceramic-forming ingredients may yield an aluminum-titanate ceramic material upon firing. In another exemplary embodiment, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

One composition, by way of a non-limiting example, which ultimately forms cordierite upon firing is as follows in percent by weight, although it is to be understood that the invention is not limited to such: about 33-41, and most preferably about 34-40 of aluminum oxide, about 46-53 and most preferably about 48-52 of silica, and about 11-17 and most preferably about 12-16 magnesium oxide.

In the practice of the present invention, the ceramic precursor batch composition comprising the binder system and an inorganic powder component consisting of a sinterable inorganic particulate material, e.g., a ceramic powder material, can be prepared by using the components in any desired amounts selected.

The inorganic ceramic-forming ingredients can be synthetically produced materials such as oxides, hydroxides, etc., or they can be naturally occurring minerals such as clays, talcs, or any combination of these. The invention is not limited to the types of powders or raw materials. These can be chosen depending on the properties desired in the body.

The hydrophobically modified cellulose ether binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are METHOCEL A4M, F4M, F240, and K75M cellulose products from Dow Chemical Co. METHOCEL A4M cellulose is a methylcellulose. METHOCEL F4M, F240, and K75M cellulose products are hydroxypropyl methylcellulose.

The properties of preferred cellulose ether binders such as methylcellulose are water retention, water solubility, surface activity or wetting ability, thickening of the mixture, dispersing and lubricating of the inorganic particles, providing wet and dry green strength to the green bodies, thermal gelation and hydrophobic association in an aqueous environment. Cellulose ether binders that promote hydrogen bonding interaction with the solvent are desirable. Examples of substituent groups that maximize the hydrogen bonding interaction with polar solvents e.g. water, are hydroxypropyl and hydroxyethyl groups, and to a smaller extent hydroxybutyl groups. While not wishing to be bound by theory, it is believed that lower molecular weight cellulose ether binders, i.e. less than or equal to about 300,000 g/mole, hydrate faster than cellulose ether binders having a molecular weight greater than 300,000 g/mole. The faster hydration of the lower molecular weight cellulose ether binders requires less water, allowing for a stiffer and stronger composition.

The hydrophobically modified cellulose ether binders may have a molecular weight of less than of equal to about 300,000 g/mole. In one exemplary embodiment the cellulose ether binder has a molecular weight of from about 50,000 g/mole to about 300,000 g/mole. In another exemplary embodiment, the cellulose ether binder has a molecular weight of from about 100,000 g/mole to about 200,000 g/mole. In a further exemplary embodiment the cellulose ether binder has a molecular weight of from about 100,000 g/mole or from about 200,000 g/mole. By way of comparison, commonly used METHOCEL F220M and METHOCEL F40M (F240) have molecular weights of 374,450 g/mole and 309,500 g/mole respectively while METHOCELS F4M and F50 have molecular weights of 178,850 g/mole and 75,650 g/mole respectively.

As illustrated in FIG. 1, the stiffening onset temperature ($T_{onset}$) is inversely proportional to the molecular weight of the cellulose ether binder. Historically the term batch "gelation temperature" has been used to define the point at which the binder undergoes its thermal phase transition. However, since polymers such as methylcellulose and hydroxypropyl methylcellulose phase separate and then subsequently gel, it's not clear which phenomenon causes the batch viscosity to increase. Therefore, to avoid confusion the more general term of "onset temperature" ($T_{onset}$) will be used herein to describe the temperature at which the batch viscosity, or stiffness, begins to increase. METHOCEL F220M, with the greatest molecular weight has the lowest $T_{onset}$ while F50, with the lowest molecular weight has the highest $T_{onset}$. It will be appreciated that the higher the $T_{onset}$, the less likely stiffening will occur during extrusion, causing increased pressures and decreased feedrates.

The hydrophobically modified cellulose ether binder may be a combination of at least two different hydrophobically modified cellulose ethers, where the average molecular weight of the combination is less than or equal to about 300,000 g/mole. Combining a higher molecular weight METHOCEL such as F40M, with a lower molecular weight cellulose ether may give a green body with increased strength over using only a low molecular weight cellulose ether such as METHOCEL F50. The combination of cellulose ethers may comprise cellulose ethers having different molecular weights. Alternatively, the combination of cellulose ethers may comprise cellulose ethers having different hydrophobic groups, different concentrations of the same hydrophobic group or other combinations. Different hydrophobic groups may be, by way of non-limiting example, hydroxyethyl or hydroxypropyl.

The hydrophobically modified cellulose ether binder makes up, as a superaddition, typically about 1-10% by weight, and more typically about 2-6% by weight of the inorganic ceramic-forming material.

The solvent provides a medium for the binder to dissolve in thus providing plasticity to the batch and wetting of the powders. The solvent can be aqueous based, which are normally water or water-miscible solvents; or organically based. Most useful are aqueous based solvents which provide hydration of the binder and powder particles. Typically, the amount of aqueous solvent is from about 20% by weight to about 50% by weight.

Figure 2:
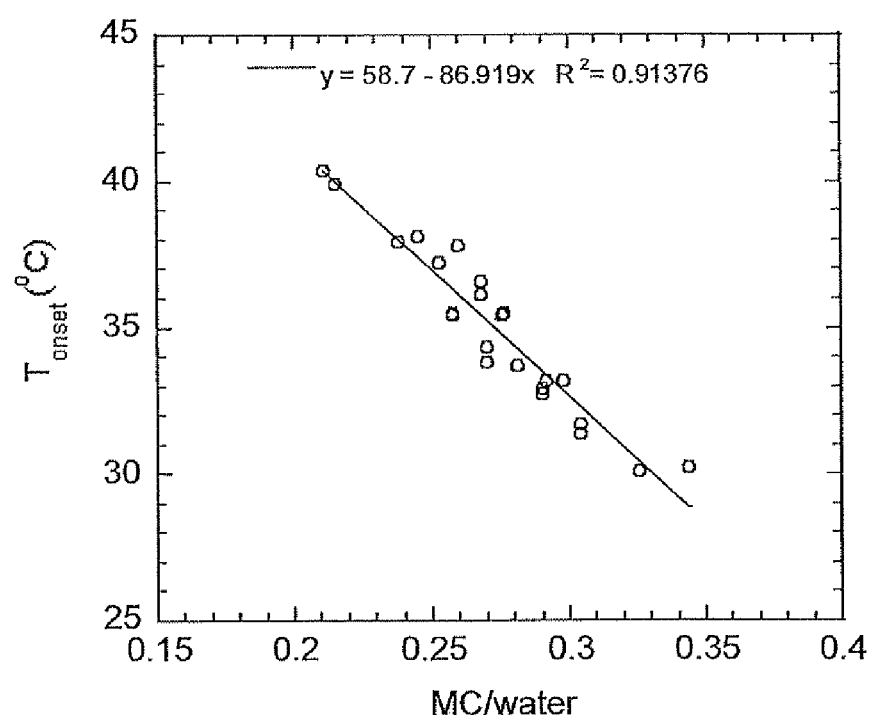
FIG. 2 is a graphical illustration showing the relationship between MC/W and the stiffening onset temperature, according to another embodiment of the present invention.
Figure 3:
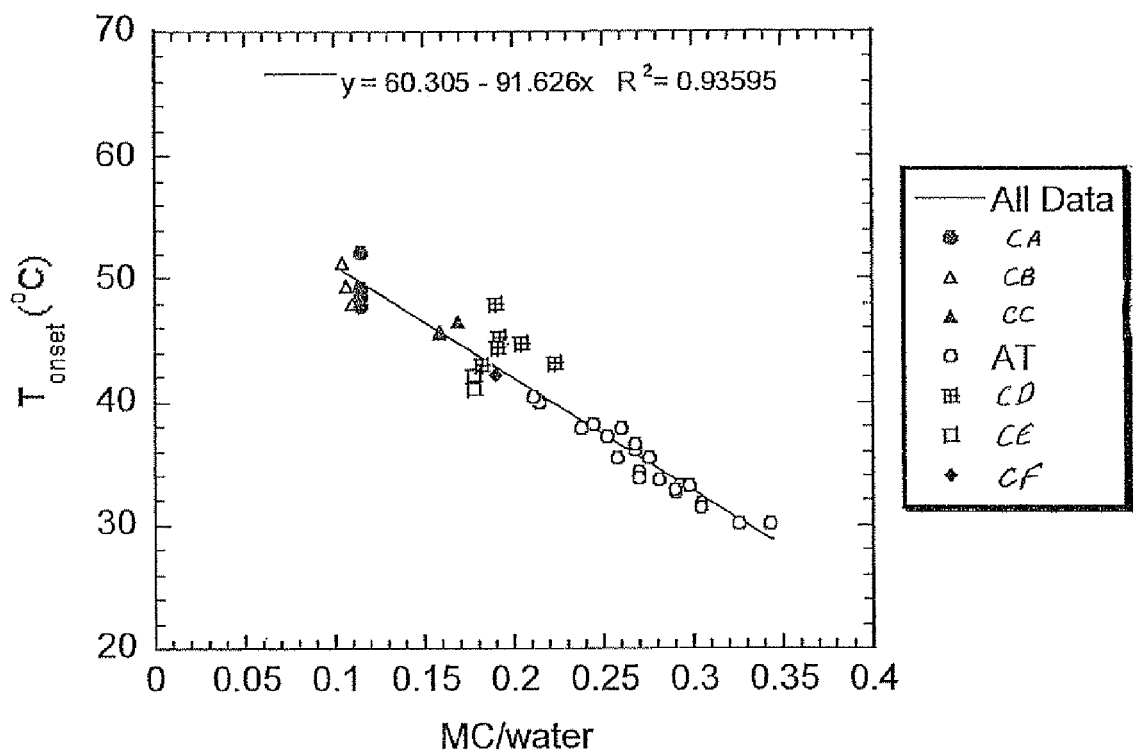
FIG. 3 is a graphical illustration showing the relationship between MC/W and the stiffening onset temperature for different batch compositions, according to one embodiment of the present invention.

It was unexpectedly found that there is a strong correlation between the ratio of cellulose ether binder to aqueous solvent (MC/W) and $T_{onset}$ wherein $T_{onset}$ decreases linearly with increasing cellulose ether binder concentrations (FIGS. 2 and 3). In contrast, there was correlation of $T_{onset}$ with the amount of water present. FIG. 2 illustrates the relationship between MC/W using METHOCEL F40M in water and aluminum-titanate ceramic-forming materials. There is about a 20° C. difference between the highest MC/W ratio of about 0.34 to the lowest of about 0.20. FIG. 3 illustrates the relationship between MC/W using METHOCEL F40M in water and different inorganic ceramic forming materials where CA-CF are cordierite compositions comprising silica, alumina, magnesia made from batches including clay, talc, silica and an alumina forming source and an optional pore former, and AT is aluminum titanate ceramic forming material. The $T_{onset}$ decreases with increasing METHOCEL concentration across all seven ceramic compositions tested. This result indicates that $T_{onset}$ is primarily driven by the aqueous METHOCEL concentration and that there is little influence from other batch parameters such as the chemistry of the inorganic components, particle size distribution, presence of oil lubricants, or surfactant type such as tall oil, stearic acid, or Liga (sodium stearate). The fundamental aspect that determines $T_{onset}$ appears to be the degree to which the methylcellulose ether or hydroxypropyl methylcellulose ether polymer chains are hydrated.

Figure 4:
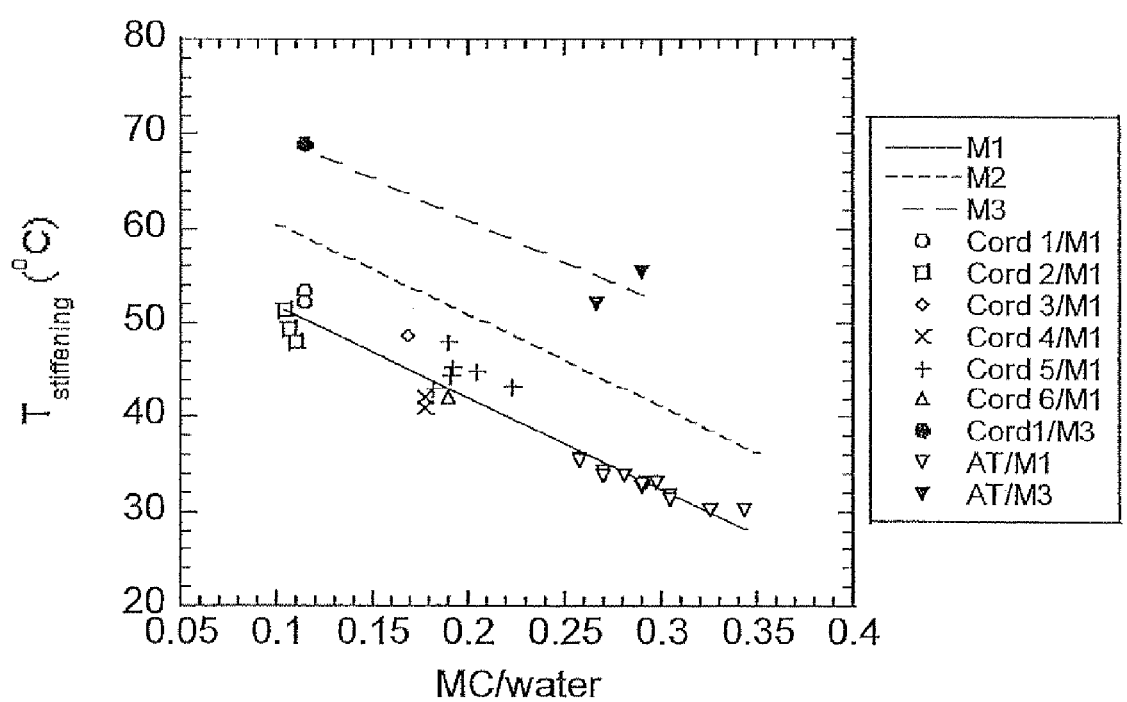
FIG. 4 is a graphical illustration showing the relationship between MC/W and the stiffening onset temperature for different batch compositions, according to one embodiment of the invention.

The correlation between MC/W and $T_{onset}$ is observed with other METHOCEL binders having lower molecular weights than F40M, as illustrated in FIG. 4. Three METHOCELS of different molecular weights were used, F40M (M1), F4M (M2) and F50 (M3). Different ceramic precursor materials were also used, such as aluminum-titanate (AT) and cordierite (Cord). For all METHOCEL binders, there is a 10-20° C. increase in $T_{onset}$ when MC/W is reduced.

In one exemplary embodiment, the MC/W ratio of the ceramic precursor batch composition of the present invention is less than 0.32. In another exemplary embodiment, the MC/W is less than 0.27. In a further exemplary embodiment, the MC/W is less than 0.22.

Decreasing MC/W results in increasing the amount of aqueous solvent present. It will be appreciated that increasing the amount of aqueous solvent present may increase the drying time of the green bodies formed from a composition with a higher MC/W. However, using a lower molecular weight cellulose ether binder can result in an increased $T_{onset}$ without significantly lowering the MC/W ratio.

The ceramic precursor batch composition of the present invention may further comprise other additives such as surfactants, oil lubricants and pore-forming material. Non-limiting examples of surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from about 0.5% by weight to about 2% by weight.

Non-limiting examples of oil lubricants are light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight. In an exemplary embodiment, the oil lubricants are present from about 3% by weight to about 6% by weight.

In filter applications, such as in diesel particulate filters, it is customary to include a burnout poreformer in the mixture in an amount effective to subsequently obtain the porosity required for efficient filtering. A burnout poreformer is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the inorganic material. If a combination of graphite and flour are used, the amount of burnout agent is typically form about 10% by weight to about 25% by weight with the graphite at 5% by weight to 10% of each and the flour at 5% by weight to about 10% by weight.

The present invention also provides a method for increasing a rate of extrusion of a ceramic precursor batch composition, comprising the steps of providing inorganic ceramic-forming ingredients, adding a hydrophobically modified cellulose ether binder and water to the inorganic ceramic forming ingredients wherein the hydrophobically modified cellulose ether binder has a molecular weight of less than about 300,000 g/mole and MC/W is less than about 0.32, wherein MC is a weight % of the hydrophobically modified cellulose ether binder based on a 100% of the inorganic ceramic-forming ingredients, and W is a weight % of the water based on the 100% of the inorganic ceramic-forming ingredients. The inorganic materials, binder and water are mixed in a muller or plow blade mixer. The water is added in an amount that is less than is needed to plasticize the batch. With water as the solvent, the water hydrates the binder and the powder particles. The surfactant and/or oil lubricant, if desired, may then be added to the mix to wet out the binder and powder particles.

The composition is then plasticized by shearing the wet mix formed above in any suitable mixer in which the batch will be plasticized, such as for example in a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a gel is formed. The gel that is formed is stiff because the system is very solvent-deficient. The surfactant enables the binder-gel to adhere to the powder particles.

In a further step, the composition is extruded to form green bodies. Extrusion is done with devices that provide low to moderate shear. For example hydraulic ram extrusion press, which is the preferred device, or two stage de-airing single auger are low shear devices. A single screw extruder is a moderate shear device. The extrusion can be vertical or horizontal. Another example of forming the green bodies is using the same plasticizing twin-screw extruder as the forming extruder when appropriate forming dies are used, as a single step process.

The bodies of this invention can have any convenient size and shape and the invention is applicable to all processes in which plastic powder mixtures are shaped. The process is especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, are those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses are from about 0.07 to about 0.6 mm (about 3 to about 25 mils), although thicknesses of about 0.02-0.048 mm (1-2 mils) are possible with better equipment. The method is especially suited for extruding thin wall/high cell density honeycombs.

The extrudates can then be dried and fired according to known techniques. The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the holding times at these temperatures are from about 1 hour to about 6 hours. For mixtures that are primarily for forming mullite, the temperatures are from about 1400° C. to about 1600° C., and the holding times at these temperatures are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours.

EXAMPLES

The invention will be further clarified by the following examples.

Example 1

Batch Stiffening Onset Temperature ($T_{onset}$)

Historically the term batch "gelation temperature" has been used to define the point at which the binder undergoes its thermal phase transition. However, since polymers such as methylcellulose and hydroxypropyl methylcellulose phase separate and then subsequently gel, it's not clear which phenomenon causes the batch viscosity to increase. Therefore, to avoid confusion we will use the more general term of "onset temperature" ($T_{onset}$) to describe the temperature at which the batch viscosity, or stiffness, begins to increase.

Figure 5:
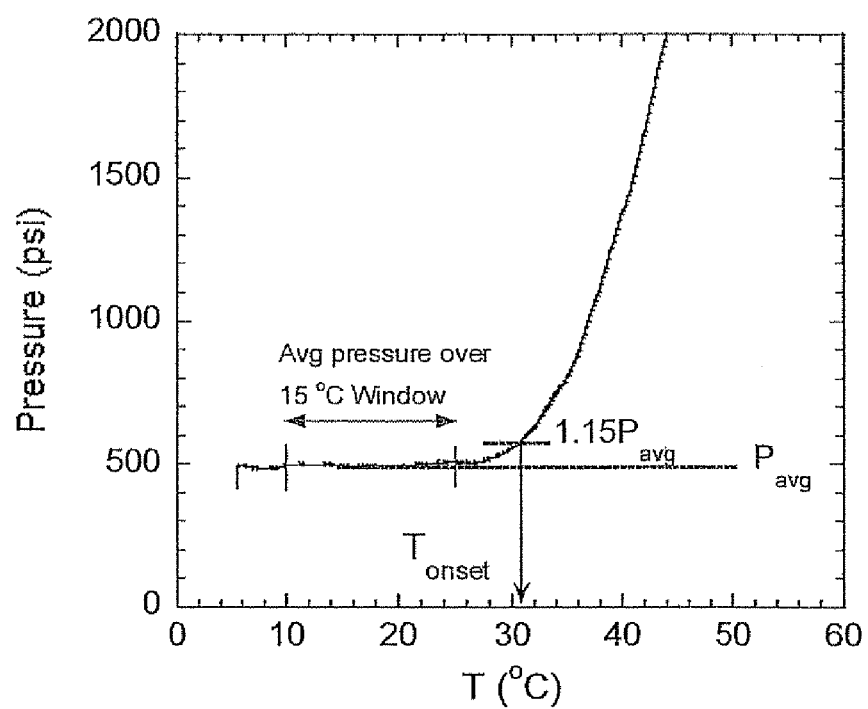
FIG. 5 is a graphical illustration showing an example of a capillary temperature sweep of an AT batch, according to the present invention.

The batch stiffening temperature of all batch samples was measured by using the capillary temperature sweep method. A Malvern RH7 capillary rheometer was used to extrude batch through two OEM capillary dies made of tungsten carbide. One die has an L/d of 16 (1 mm diameter) while the other is an orifice die with an L/d of 0.25. The batch is extruded at a linear extrudate velocity of 12.7 mm/s at a temperature ramp rate of 1° C./min. FIG. 5 shows data from a typical temperature sweep test of AT.

Only the data from the orifice die is used to determine $T_{onset}$ because this die almost always produces a flat baseline pressure during the temperature ramp. This baseline pressure is essential for how $T_{onset}$ is defined. Starting at five degrees above the initial temperature of the scan, the pressure over the next 15 degrees was averaged. The average pressure over this 15° C. window is termed $P_{avg}$. Pressure data from the first five degrees was not used in order to avoid any pressure start up effects which could alter $P_{avg}$. The fifteen degree window provides a sufficient amount of data to establish a baseline pressure. Once $P_{avg}$ was obtained, a pressure that is 15% higher than this value was calculated. $T_{onset}$ is taken to be the temperature which is at a value 1.15 $P_{avg}$. On an extruder that is operating near the binder gel point, an increase in extrusion pressure of 15% above a stable pressure is indicative of a significant change in batch rheology related to the binder transition.

The capillary temperature sweep method used to measure $T_{onset}$ has several advantages over the conventional method of using a Brabender mixer. First, the orifice die pressure has much less noise and fluctuation than typical torque readings produced by a Brabender. Second, the capillary method measures $T_{onset}$ of a batch sample in a fixed shear history state. This can not be done with the Brabender method because the Brabender shears the batch during a temperature ramp and therefore the level of specific mixing energy imparted to the material increases continuously during the test.

Example 2

Effect of Hydroxypropyl Methylcellulose Concentration on $T_{onset}$

A review of the literature shows that the findings are mixed with regard to how the gel point of methyl cellulose and hydroxypropyl methylcellulose solutions are affected by polymer concentration. Some reports indicate that the gel temperature of hydroxypropyl methylcellulose solutions decreases linearly with increasing concentration up to 10 wt %. Unfortunately these results have not been reproduced, even after significant efforts to do so. In fact, the dynamic thermorheological results agree with those reported in the prior art who saw no dependence of polymer concentration on the gel points of E, F, and K-type HPMC solutions.

Though there have been numerous studies on the gelation of methyl cellulose and hydroxypropyl methylcellulose solutions, there has been very little reported on how the concentration of methyl cellulose and hydroxypropyl methylcellulose affects the stiffening temperature of a highly filled ceramic batch.

A study with AT was conducted to determine how binder concentration affects $T_{onset}$ in an actual ceramic batch composition used in production. AT samples were prepared by twin screw machine in four separate investigations. Two sets of tests were conducted in the lab where we measured batch stiffening temperature $T_{onset}$ of 13 mm diameter rods extruded directly from a 34 mm twin screw machine. The other two sets of tests were conducted on samples prepared on a 90 mm production twin screw machine. The honeycomb ware samples from the 90 mm extruder were compressed into blocks using a hydraulic press. 13 mm diameter rods were cored from these blocks to load into the capillary rheometer for temperature ramp testing.

Using the 90 mm extruder, F40M METHOCEL binder (Dow Chem. Co.) was used in all samples and measured $T_{onset}$ at 3.5, 4.0 and 4.5% METHOCEL and two water calls at each METHOCEL level. As the level of METHOCEL was reduced, it was observed that the batch began to stiffen at a higher temperature.

$T_{onset}$ clearly showed a linear relationship with METHOCEL to water ratio in the AT composition. However, production samples of AT typically have a $T_{onset}$ value in the low 30's ° C. which is much lower than compositions of cordierite. $T_{onset}$ of CA was approximately 20° C. higher than that of AT even though both compositions use the exact same binder. The only time such a large difference in stiffening temperature has been observed is when two different binder chemistries have been compared such as an A-type methycellulose versus a K-type hydroxypropyl methylcellulose. It is hypothesized that the large differences in $T_{onset}$ could be due to the differences in METHOCEL concentration.

Temperature sweep data for a variety of auto and diesel compositions were used to determine if binder concentration was responsible for the differences in $T_{onset}$. $T_{onset}$ values for seven ceramic auto and diesel compositions were examined. All samples contained F40M METHOCEL and were made with either the 34 mm twin screw, 90 mm production twin screw, or were plasticized in a Brabender mixer for 10-20 minutes to simulate the plasticizing step that occurs in a twin screw machine. FIG. 3 shows a plot of $T_{onset}$ for all ceramic compositions versus the METHOCEL/water ratio.

The results in FIG. 3 show that there is a strong linear correlation between $T_{onset}$ and the aqueous concentration of binder in the batch. The batch stiffening temperature decreases with increasing METHOCEL concentration across all seven ceramic compositions tested. This result indicates that $T_{onset}$ is primarily driven by the aqueous METHOCEL concentration and that there is little influence from other batch parameters such as the chemistry of the inorganic components, particle size distribution, presence of oil lubricants, or surfactant type such as tall oil, stearic acid, or Liga (sodium stearate). The fundamental aspect that determines $T_{onset}$ appears to be the degree to which the methyl cellulose and hydroxypropyl methylcellulose polymer chains are hydrated.

Example 3

Effect of Binder Molecular Weight on $T_{Onset}$

Another secondary parameter that can impact $T_{onset}$ is the molecular weight of the binder. There is one report in the prior art that shows the impact of the binder molecular weight on the gelation temperature of a ceramic batch. (Scheutz, J. E. *Ceramic Bulletin*, 65, 1556-1559 (1986). In this report a Brabender mixer was used to measure the torque as a function of temperature of alumina batch samples using K4M and K15M viscosity grade METHOCELS as the binders at 2.5% and 5% loading. The results of the 2.5% binder test showed that the lower viscosity (i.e. lower molecular weight) K4M binder had a gelation temperature 14° C. above that of the higher molecular weight K15M binder. At 5% binder level, the K4M had a gelation temperature 8° C. higher than K15M. Since only two molecular weights were used in this study, there is no way to determine if there is a well-defined relationship between binder molecular weight and gelation temperature. In addition to this, the batch gelation temperatures were not compared on equal mixing energy basis since mixing energy was not controlled.

The effect molecular weight has on $T_{onset}$ of an AT batch was measured in a controlled experiment using four viscosity grades of an F-type METHOCEL: F220M, F40M, F4M, and F50 with F220M being the highest molecular weight and F50 being the lowest. A 4.5% binder and 16% Emulsia T plus 2% additional water in each sample were used. All samples were plasticized in the muller prior to extruding rods for the capillary temperature sweep.

The results showed that the onset temperature increased with decreasing binder molecular weight. $T_{onset}$ has a very well-correlated dependence on molecular weight as is shown in FIG. 1.

What is claimed is:

1. A method for increasing a rate of extrusion of a ceramic precursor batch composition, comprising:
    preparing a ceramic precursor batch composition by providing inorganic ceramic-forming ingredients; and
    adding a combined hydroxypropyl methylcellulose binder and water to the inorganic ceramic forming ingredients, the combined hydroxypropyl methylcellulose binder having a molecular weight of less than about 300,000 and comprising at least one high molecular weight hydroxypropyl methylcellulose binder having a molecular weight of greater than about 300,000 g/mole and at least one low molecular weight hydroxypropyl methylcellulose binder having a molecular weight of less than about 300,000 g/mole,
    wherein the rate of extrusion is increased by:
        (a) adding the combined hydroxypropyl methylcellulose binder having a molecular weight of less than about 300,000 g/mole, and
        (b) adding the combined hydroxypropyl methylcellulose binder and water in amounts such that the ratio MC/W is less than about 0.32,
    wherein MC is a weight % of the at combined hydroxypropyl methylcellulose binder based on a 100% of the inorganic ceramic-forming ingredients, and W is a weight % of the water based on the 100% of the inorganic ceramic-forming ingredients;
    optionally adding at least one of a pore-forming material, a lubricant, or a surfactant to the ceramic precursor batch composition;
    plasticizing the inorganic ceramic-forming ingredients, the combined hydroxypropyl methylcellulose binder and water to form the ceramic precursor batch composition; and extruding the ceramic precursor batch.

2. The method of claim 1 wherein the at least one low molecular weight hydroxypropyl methylcellulose binder has a molecular weight of from about 50,000 g/mole to about 300,000 g/mole.

3. The method of claim 1 wherein the at least one low molecular weight hydroxypropyl methylcellulose binder has a molecular weight of less than about 200,000 g/mole.

4. The method of claim 1 wherein the at least one low molecular weight hydroxypropyl methylcellulose binder has a molecular weight of less than about 100,000 g/mole.

5. The method of claim 1 wherein MC/W is less than about 0.27.

6. The method of claim 1 wherein MC/W is less than about 0.22.

7. The method of claim 1, wherein in the pore-forming material is graphite.

8. The method of claim 1 wherein the pore-forming material comprises from about 10 wt % to about 30 wt % of the ceramic precursor batch composition.

9. The method of claim 1 wherein the surfactant comprises from about 0.5 wt % to about 2 wt % of the ceramic precursor batch composition.

10. The method of claim 1 wherein the surfactant comprises from about 3 wt % to about 6 wt % of the ceramic precursor batch composition.

11. A method for decreasing the amount of pressure required for extrusion of a ceramic precursor batch composition, comprising:
    providing an initial ceramic precursor batch composition comprising inorganic ceramic-forming ingredients, at least one high molecular weight hydroxypropyl methylcellulose binder having a molecular weight of greater than about 300,000 g/mole, and water;
    adding at least one low molecular weight hydroxypropyl methylcellulose binder having a molecular weight of less than about 300,000 g/mole to the initial ceramic precursor batch composition, wherein the amount of pressure required for extrusion is decreased by:
        (a) choosing the at least one high molecular weight hydroxypropyl methylcellulose binder and at least one low molecularweiqht hydroxypropyl methylcellulose binder such that the average molecular weight for the high molecular weight binder and the low molecular weight binder combined is less than about 300,000 g/mole;
        (b) adjusting a ratio of MC/W to be less than about 0.32 wherein MC is a weight % of the at least one hydroxypropyl methylcellulose binder based on a 100% of the inorganic ceramic-forming ingredients, and W is a weight % of the water based on the 100% of the inorganic ceramic-forming ingredients, and
    optionally adding at least one of a pore-forming material, a lubricant, or a surfactant.

12. The method of claim 11 wherein in the pore-forming material is graphite.

13. The method of claim 11 wherein the pore-forming material comprises from about 10 wt % to about 30 wt % of the ceramic precursor batch composition.

14. The method of claim 11 wherein the surfactant comprises from about 0.5 wt % to about 2 wt % of the ceramic precursor batch composition.

15. The method of claim 11 wherein the surfactant comprises from about 3 wt % to about 6 wt % of the ceramic precursor batch composition.

16. A method for increasing the Tonset of a ceramic precursor batch composition, comprising:
    preparing a ceramic precursor batch composition by providing inorganic ceramic-forming ingredients; and adding a combined hydroxypropyl methylcellulose binder and water to the inorganic ceramic forming ingredients, the combined hydroxypropyl methylcellulose binder having a molecular weight of less than about 300,000 and comprising at least one high molecular weight hydroxypropyl methylcellulose binder having a molecular weight of greater than about 300,000 g/mole and at least one low molecular weight hydroxypropyl methylcellulose binder having a molecular weight of less than about 300,000 g/mole,
    wherein the Tonset of the ceramic precursor batch composition is increased by:
        (a) adding the combined hydroxypropyl methylcellulose binder having a molecular weight of less than about 300,000 g/mole; and
        (b) adjusting a ratio of MC/W to be less than about 0.32, wherein MC is a weight % of the combined hydroxypropyl methylcellulose binder based on a 100% of the inorganic ceramic-forming ingredients, and W is a weight % of the water based on the 100% of the inorganic ceramic-forming ingredients.

17. The method of claim 16 wherein the at least one low molecular weight hydroxypropyl methylcellulose binder has a molecular weight ranging from about 50,000 g/mole to about 300,000 g/mole.

18. The method of claim 16 wherein the at least one low molecular weight hydroxypropyl methylcellulose binder has a molecular weight of less than about 200,000 g/mole.

19. The method according to claim 16, wherein the at least one low molecular weight hydroxypropyl methylcellulose binder is chosen from Methocel F4M, Methocel F240, and Methocel F50.

20. The method according to claim 16, wherein the ceramic precursor batch composition has a Tonset that increases linearly with decreasing hydroxypropyl methylcellulose binder concentration.

* * * * *